United States Patent [19]

Meyn

[11] Patent Number: 5,318,428
[45] Date of Patent: Jun. 7, 1994

[54] METHOD AND APPARATUS FOR DIVIDING A PACKAGE REMOVED FROM A BIRD

[75] Inventor: Cornelis Meyn, Oostzaan, Netherlands

[73] Assignee: Machinefabriek Meyn B.V., Oostzaan

[21] Appl. No.: 968,852

[22] Filed: Oct. 30, 1992

[30] Foreign Application Priority Data

Nov. 7, 1991 [NL] Netherlands ............ 9101856

[51] Int. Cl.⁵ ............................................. A22C 21/00
[52] U.S. Cl. ....................................... 452/106; 452/112
[58] Field of Search ............... 452/106, 111, 112, 109

[56] References Cited

U.S. PATENT DOCUMENTS

| | | | |
|---|---|---|---|
| 4,951,352 | 8/1990 | Harben, III et al. | 452/106 |
| 5,041,052 | 8/1991 | Conner et al. | 452/106 |
| 5,041,053 | 8/1991 | Ellis et al. | |
| 5,152,175 | 10/1992 | Van de Eerden et al. | 452/106 |

FOREIGN PATENT DOCUMENTS

| | | |
|---|---|---|
| 813138 | 4/1974 | Belgium . |
| 1415153 | 11/1975 | United Kingdom . |
| 2004175 | 3/1979 | United Kingdom . |

OTHER PUBLICATIONS

Netherlands Search Report with Translation.

*Primary Examiner*—Willis Little
*Attorney, Agent, or Firm*—Dority & Manning

[57] ABSTRACT

The invention provides a method and apparatus for dividing a package removed from a bird, which may include intestines, liver and heart with lungs, into separate parts. Using the method and apparatus, firstly the heart-lungs assembly is cut loose from the package, whereafter the intestines and liver are separated. For cutting loose the heart-lungs assembly, a cutting means positioned alongside a conveyor for the package may be applied, whereas the separation of the intestines and liver may be carried out through a separating means cooperating with the conveyor. As the conveyor, a rotating disc with reception slots for the packages may be considered. In the alternative, a chain conveyor comprising carriers with reception slots is also possible.

16 Claims, 2 Drawing Sheets

METHOD AND APPARATUS FOR DIVIDING A PACKAGE REMOVED FROM A BIRD

BACKGROUND OF THE INVENTION

The prevent invention relates to a method for dividing a package removed from a bird, comprising intestines, liver and heart with lungs, in separate parts. Further, the invention related to an apparatus for carrying out the inventive method.

The separate parts of a package comprising intestines, liver, and heart with lungs have different destinations, such that it is required to separate them. After such a package has been eviscerated from a bird in a way known per se, the package is presently divided into separate parts manually.

OBJECTS AND SUMMARY OF THE INVENTION

It is an object of the invention to provide a method and apparatus for the automated division of a package into separate parts.

Additional objects and advantages of the invention will be set forth in part in the description which follows, and in part will be obvious from the description, or may be learned by practice of the invention.

Thus, the method according to the invention is characterized by moving the package along processing stations for firstly cutting loose the heart-lungs assembly from the package and for next separating the intestines from the liver.

The method according to the invention is less labor intensive than the known method and its processing velocity is considerably higher.

The apparatus for carrying out the method according to the invention is characterized by a conveyor for the package. A cutting means is further provided for cutting loose the heart-lungs assembly from the package positioned alongside said conveyor, as well as a separating means cooperating with the conveyor for separating the intestines and the liver. The packages moved along by this conveyor are thus automatically divided into separate parts by this apparatus. The provision of the packages on the conveyor could occur automatically, but also manually.

Preferably, the conveyor comprises a rotating disc which at its circumference is provided with substantially radially extending reception slots for clampingly receiving a package to be processed. In this manner, the heart-lungs assembly and liver are positioned at one side of the disc with the intestines at the other side. During rotation of the disc, a package clamped in one of the reception slots successively passes the cutting means for cutting loose the heart-lungs assembly and the separating means for separating the intestines and liver. After the heart-lungs assembly has been cut loose from the package only the liver and intestines are present at opposite sides of the disc. The heart-lungs assembly, which has been cut loose by the cutting means, is discharged by appropriate means.

After passing the separating means, the liver and intestines are separated and discharged through appropriate discharge means.

Preferably, the cutting means is a rotating knife, such that cutting loose the heart-lungs assembly may occur without strong forces being applied thereupon. Thus an unwanted damaging of the package and its parts may be avoided.

Further, it is preferred that a guide extends from the conveyor towards the cutting means such that the heart-lungs assembly will pass this cutting means at the one side, whereas the liver will pass at the other side between said cutting means and the conveyor. Through such a guide, the section of the package comprising liver and heart-lungs assembly is offered to the cutting means in an appropriate way, such that the cut for cutting loose the heart-lungs assembly will be applied between this section and the liver.

In relation therewith, it is also possible that the guide shortly ahead of the cutting means branches off into two guiding sections passing the cutting means at opposite sides. Thus it can be guaranteed that, while passing the cutting means, both the heart-lungs assembly and liver keep out of reach of the cutting means, such that damaging of these parts is prevented.

According to the invention, the separating means preferably comprises two stripper discs engaging opposite sides of the conveyor. Through these stripper discs, such forces are applied upon the intestines on the one hand and the liver on the other hand, that these parts are torn loose from each other.

Generally, the parts of a package to be processed are surrounded by membranes. One of these membranes extends, among others, between the liver and intestines. Apart from the tissue connecting the liver and intestines, this membrane thus defines and additional connection between these two parts of the package. Such a membrane however renders the provision of a package in a reception slot of the conveyor more difficult. For providing a solution therefor, the apparatus according to the invention is in a preferred embodiment characterized in that, ahead of the cutting means, an additional separating means is provided for loosening a membrane extending, among others, between the liver and the intestines, wherein the conveyor comprises pairs of reception slots, respectively existing of a rearward reception slot for receiving the tissue connecting the liver and intestines and a forward reception slot for receiving the membrane. With the aid of the additional separating means, the membrane extending between the liver and intestines is loosened, whereafter the further processing of the package may occur in the above described way.

In this respect, it is further preferred that the conveyor comprises a chain conveyor having a number of carriers for the packages with each carrier being provided with a pair of reception slots.

Hereinafter the invention will be elucidated by means of the drawing, in which embodiments of the apparatus according to the invention are illustrated.

DESCRIPTION OF THE PREFERRED EMBODIMENTS

Figure 2:
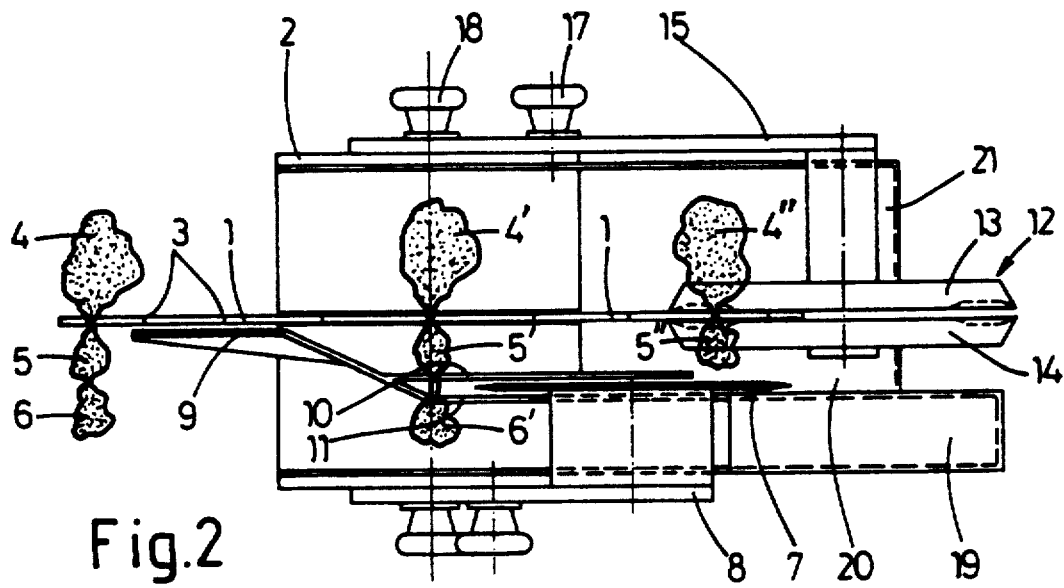
FIG. 2 shows the apparatus of FIG. 1 in a top plan view.

Reference will now be made in detail to the presently preferred embodiments of the invention, one or more examples of which are illustrated in the drawings. Each example is provided by way of explanation, not limitation of the invention. The numbering of components in the drawings is consistent throughout the application, with the same components having the same number in each of the drawings.

Figure 1:
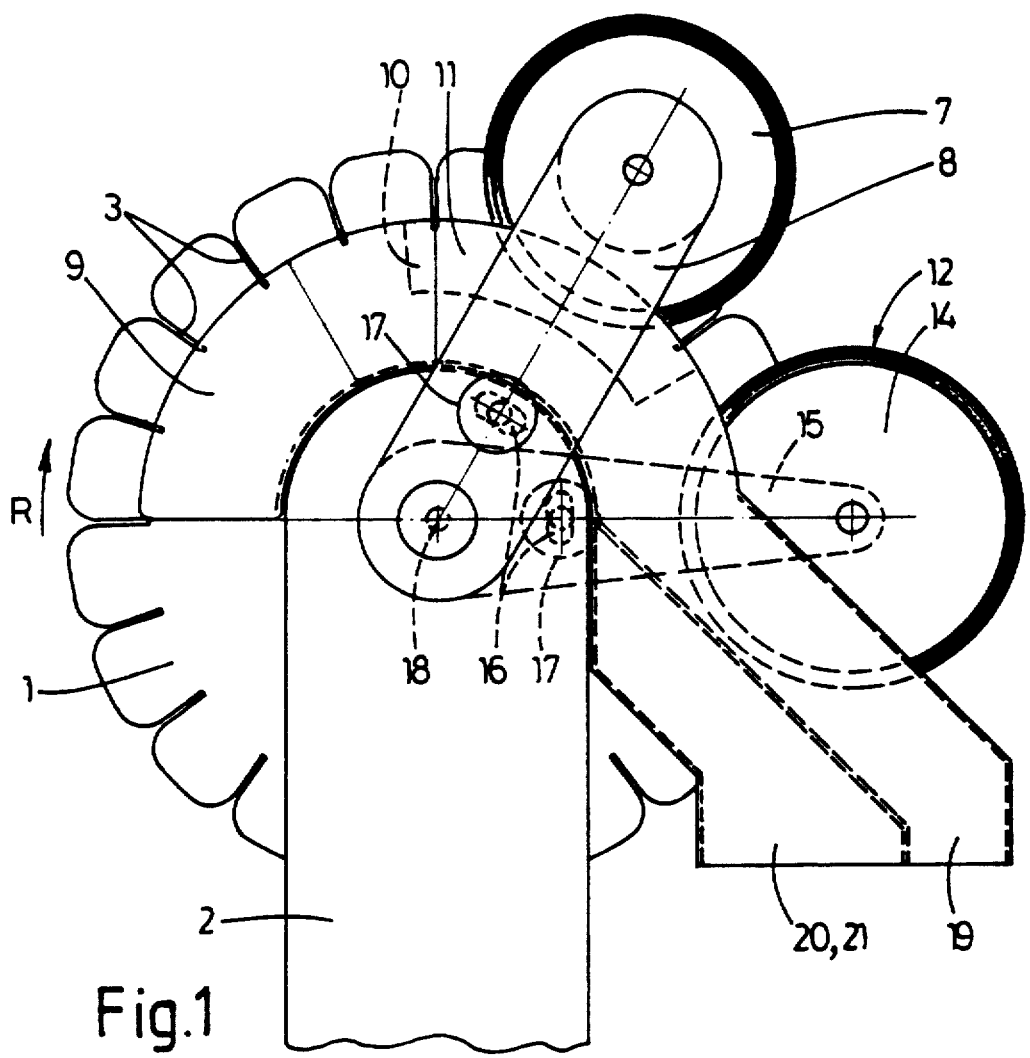
FIG. 1 shows, schematically, in a side elevational view part of an embodiment of the apparatus according to the invention.

As appears clearly from FIG. 1, the apparatus according to the invention comprises in the illustrated embodiment a rotating disc 1, which is journaled in a frame or base 2. In a way not shown further, the rotating disc 1 is rotated by a motor in correspondence with arrow R.

At its circumference the rotating disc 1 comprises substantially radially extending reception slots 3. The packages which have been removed from a bird and have to be divided in separate parts are clampingly received in these slots. As has been indicated schematically in FIG. 2 such a package comprises intestines 4, liver 5 and heart-lungs assembly 6.

Somewhat distanced alongside the rotating disc 1 (as is visible in FIG. 2) a cutting means shaped as a rotating knife 7 is provided on a support arm 8 connected with frame 2. In a way not shown further knife 7 is driven by a motor.

At the side of the rotating disc 1 where the knife 7 is positioned, a plate-shaped guide 9 is provided. As appears especially from FIG. 2, the guide 9 extends in the rotational direction of the rotating disc 1 firstly in parallel with the disc. In a next portion, the guide is inclined away from the disc 1, and finally branches off into two guiding sections 10 and 11 passing the knife 7 at opposite sides.

Further, the apparatus according to the invention is provided with a separating means 12 comprising (as appears from FIG. 2) two stripper discs 13 and 14 engaging opposite sides of the rotating disc 1. These stripper discs 13 and 14 are mounted on a support arm 15 which is connected to frame 2.

The edges of the stripper discs 13 and 14 are shaped such they cooperate with the radially extending reception slots 3 of the rotating disc 1 and act like scissors during the rotation of the disc. The support arms 8 and 15 of the knife 7 and stripper discs 13 and 14, respectively, are both slightly adjustable relative to the disc 1. This has been indicated schematically by lockable knobs 17 engaging slit-shaped openings 16. When the knobs 17 have been released the arms 8 and 15, respectively, can pivot around an axis 18 in a limited way. The adjustability of the knife 7 and the stripper discs 13 and 14 relative to the rotating disc 1 leads to the possibility of obtaining an optimal operation of the respective parts.

The apparatus operates as follows:

A package comprising intestines 4, liver 5 and heart-lungs assembly 6 is clampingly received in a reception slot 3 of the rotating disc 1 with its tissue connecting the intestines and adjoining liver. This can be carried out manually, but also in an automated manner. During the rotation of the disc 1 the upper side of the guiding 9 engages the liver and heart-lungs assembly, especially the tissue connecting these two parts of the package. As a result of the shape of this guiding, shown in FIG. 2, the liver and heart-lungs assembly will, shortly before reaching the knife 7, reach the position which has been indicated by 5' and 6'. Then the liver 5' is positioned between the rotating disc 1 and the guiding section 10, whereas the heart-lungs assembly is positioned at the opposite side of the knife 7 alongside the guiding section 11.

During further rotation of the rotating disc 1 the knife 7 cuts loose the heart-lungs assembly from the liver, whereafter this assembly drops in a first container 19.

During further rotation of the disc 1 the intestines and liver reach the positions indicated with 4'' and 5'', in which they are close to the edge of the stripper discs 13 and 14. Together with the edges of the respective reception slot 3 in the disc 1 the stripper discs 13 and 14 act like scissors on the tissue connecting the intestines 4'' and liver 5'', this tissue being cut through such that the liver 5'' drops in a container 20, whereas the intestines 4'' drop in a container 21 at the opposite side of the disc 1.

Optionally the stripper discs 13 and 14 may be rotating, and may thus comprise an appropriate driving means.

Figure 3:
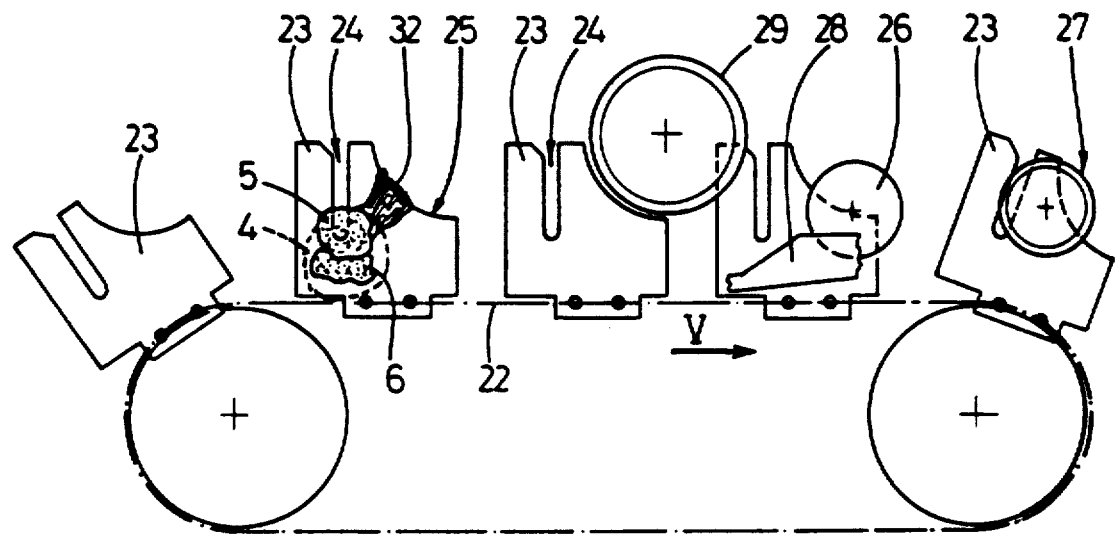
FIG. 3 shows, schematically, a side elevational view of a second embodiment of the apparatus according to the invention.
Figure 4:
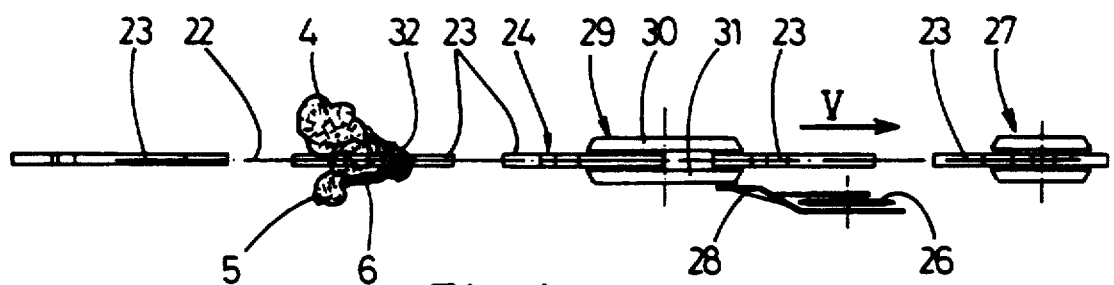
FIG. 4 shows the apparatus according to FIG. 3 in a top plan view.

In the alternative embodiment of the apparatus according to FIGS. 3 and 4, the conveyor comprises a chain conveyor 22 indicated schematically by a striped and dotted line. The direction of motion of the chain conveyor is indicated by arrow V. The chain conveyor supports a number of carriers 23 each being provided with a rearward reception slot 24 and a forward reception slot 25. In the illustrated embodiment the forward reception slot 25 proceeds in the leading edge of the carrier 23.

The reception slot 24 functions similar to the reception slots 3 of the emodiment of the apparatus according to FIG. 1 and 2. Thus, the tissue connecting liver 5 and intestines 4 is received in the reception slot 24. The forward reception slot 25 is meant for receiving a membrane 32 (see FIG. 4) extending between liver 5 and intestines 4.

As with the embodiment according to FIGS. 1 and 2, a cutting means 26 and a separating means 27 comprising two stripper discs are positioned alongside the conveyor. The operation of the cutting means 26 and the separating means 27 is identical to the operation of the cutting means 7 and the separating means 12 according to the previously mentioned embodiment of the apparatus.

Again in correspondence with the previously mentioned embodiment a guide 28 extends at the cutting means 26.

Compared to the previously mentioned embodiment, the embodiment according to FIGS. 3 and 4 comprises an additional separating means 29 which again may comprise two stripper discs 30 and 31. During the passage of a carrier 23, the stripper discs 30 and 31 take care of loosening the membrane 32, such that only the tissue part received in the reception slot 24 forms a connection between liver 5 and intestines 4 of the package.

For obtaining an optimal operation of the separating means 29 comprising stripper discs 30 and 31, care has been taken that the edge portion of the carrier 23 defining the reception slot 25 has a radius of curvature corresponding with the radius of the stripper disc 30 and 31. Further the lowermost section of the stripper discs 30 and 31 has a higher elevation than the lowermost end of the reception slot 24 such that during the passage of the carrier 23 alongside the stripper discs 30 and 31, the previously mentioned tissue part is not loosened.

Of course it is possible too that the disc 1 of the embodiment shown in FIG. 1 and FIG. 2 comprises pairs of reception slots corresponding with the reception slots 24 and 25.

The invention is not limited to the emobodiments described, herein, which can be varied widely within the scope of the invention. Thus it is possible, for example, that apart from the guiding plate 9 or 28, the guide further comprises a guide rod extending at a short distance thereabove, such that the tissue connecting the heart-lungs assembly and the liver is enclosed between such a guide rod and the upper edge of the guide plate 9.

It will be apparent to those skilled in the art that various modifications and variations can be made in the present invention without departing from the scope or spirit of the invention. Thus, it is intended that the present invention cover such modifications and variations as come within the scope of the appended claims and their equivalents.

I claim:

1. An apparatus for dividing the package removed from a bird, the package including intestines, liver, and heart with lungs, said apparatus comprising:
   a conveyor having a first side and a second side, said conveyor including clamping means defined therein for receiving and clamping the package so that the intestines are located at said first side and the liver and the heart with lungs are located at said second side;
   a guide device disposed alongside said second side of said conveyor, said guide device configured to separate the heart with lungs and the liver as the package is conveyed thereby;
   a cutting device operably disposed adjacent said conveyor, said cutting device configured for cutting loose the heart with lungs from the package; and
   a first separating device operably configured on each side of said conveyor for detaching the intestines from the liver as the package is conveyed therethrough.

2. The apparatus as in claim 1, wherein said conveyor comprises a rotating disc and said clamping means comprises slots defined in the radial edge of said disc.

3. The apparatus as in claim 2, wherein said guide comprises a radial plate structure disposed adjacent at least a portion of the radial edge of said disc.

4. The apparatus as in claim 3, wherein said guide further comprises sections extending along opposite sides of said cutting means, said guide thereby separating the heart with lungs and the liver on opposite sides of said cutting device.

5. The apparatus as in claim 2, wherein said cutting device comprises a rotating knife, said knife being pivotable about a common axis with said rotating disc.

6. The apparatus as in claim 5, further comprising means for adjusting said knife relative said rotating disc.

7. The apparatus as in claim 1, wherein said separating device comprises discs disposed on each side of said conveyor operably downstream from said cutting device, wherein each of said discs cooperates with its respective side of said conveyor for detaching the intestines from the liver.

8. The apparatus as in claim 7, wherein said discs are rotating discs.

9. The apparatus as in claim 1, wherein said conveyor comprises a chain conveyor, said chain conveyor further comprising a plurality of package carriers disposed therealong for positioning the packages.

10. The apparatus as in claim 9, wherein said chain conveyor is a linear conveyor.

11. The apparatus as in claim 1, further comprising a second separating device disposed on opposite sides of said conveyor between said cutting device and said first separating device.

12. An apparatus for dividing the package removed from a bird, the package including intestines, liver, and heart with lungs, said apparatus comprising:
   a generally circular rotating conveyor, said conveyor including a plurality of package receiving positions disposed along the radial edge thereof, said receiving positions configured to carry packages so that the intestine is on one side of said conveyor and the liver and heart with lungs are on the other side of said conveyor;
   a cutting device disposed along at least a portion of the radial edge of said conveyor, said cutting device configured to cut the heart with lungs loose from the package; and
   a separating device disposed on opposite sides of said conveyor along at least a portion of the radial edge of said conveyor, said separating device configured to tear the intestine from the liver.

13. The apparatus as in claim 12, further comprising a guide disposed along at least a portion of the radial edge of said conveyor, said guide configured to separate the intestine from the heart with liver before said package is conveyed to said separating device.

14. A method for separating the package removed from a bird into its separate components, the package including intestines, liver, and heart with lungs, said method comprising the steps of:
   clamping the package into a predetermined position on a conveyor so that the intestines are on one side of the conveyor and liver and heart with lungs are on the other side of the conveyor;
   conveying the clamped package past a guide device and separating the heart with lungs from the liver with the guide device;
   cutting the heart with lungs away from the liver with a cutting device operably downstream from the guide; and
   conveying the clamped package to a first separating device which is disposed on opposite sides of the conveyor and detaching the intestines from the liver by passing the membrane connecting the intestines with the liver through the separating device.

15. The method as in claim 14, further comprising conveying the package with a circular rotating disc conveyor and clamping the packages into slots defined along the radial edge of the rotating disc.

16. The method as in claim 14, further comprising conveying the package through an additional separating device operably disposed between the cutting device and the first separating device for exposing the membrane connecting the intestines to the liver so that the connecting membrane can be readily torn by the first separating device.

* * * * *